United States Patent
Wehrmann et al.

(10) Patent No.: US 10,323,145 B2
(45) Date of Patent: Jun. 18, 2019

(54) COPOLYCARBONATE COMPOSITIONS WITH CYCLIC AND LINEAR OLIGOMERS AND IMPROVED OPTICAL PROPERTIES

(71) Applicant: Covestro Deutschland AG, Leverkusen (DE)

(72) Inventors: Rolf Wehrmann, Krefeld (DE); Helmut Werner Heuer, Leverkusen (DE); Anke Boumans, Goch (DE)

(73) Assignee: COVESTRO DEUTSCHLAND AG, Leverkusen (DE)

(*) Notice: Subject to any disclaimer, the term of this patent is extended or adjusted under 35 U.S.C. 154(b) by 6 days.

(21) Appl. No.: 15/501,096

(22) PCT Filed: Jul. 31, 2015

(86) PCT No.: PCT/EP2015/067648
§ 371 (c)(1),
(2) Date: Feb. 1, 2017

(87) PCT Pub. No.: WO2016/016424
PCT Pub. Date: Feb. 4, 2016

(65) Prior Publication Data
US 2018/0179378 A1    Jun. 28, 2018

(30) Foreign Application Priority Data
Aug. 1, 2014  (EP) ..................... 14179572

(51) Int. Cl.
*C08L 69/00*    (2006.01)
(52) U.S. Cl.
CPC ........... *C08L 69/00* (2013.01); *C08L 2201/10* (2013.01); *C08L 2205/025* (2013.01)
(58) Field of Classification Search
None
See application file for complete search history.

(56) References Cited

U.S. PATENT DOCUMENTS

| | | | |
|---|---|---|---|
| 6,103,856 A | 8/2000 | Funakoshi et al. | |
| 9,969,879 B2* | 5/2018 | Wehrmann | C08L 69/00 |
| 2002/0115758 A1* | 8/2002 | Gorny | C08K 5/005 524/104 |
| 2003/0214070 A1 | 11/2003 | Goossens et al. | |
| 2007/0299241 A1 | 12/2007 | Domingo et al. | |
| 2011/0040066 A1* | 2/2011 | Wehrmann | C08G 64/06 528/167 |
| 2011/0144283 A1 | 6/2011 | Heuer et al. | |
| 2013/0030113 A1* | 1/2013 | Hitomi | C08L 69/00 524/537 |
| 2014/0243467 A1 | 8/2014 | Dern et al. | |
| 2017/0226340 A1* | 8/2017 | Wehrmann | C08L 69/00 |

FOREIGN PATENT DOCUMENTS

| | | | |
|---|---|---|---|
| AU | 20120241359 | * | 6/2011 |
| EP | 0953605 A2 | | 11/1999 |
| EP | 2333012 A1 | | 6/2011 |
| WO | WO 2003095521 A1 | | 11/2003 |

(Continued)

OTHER PUBLICATIONS

International Search Report and Written Opinion for International Application No. PCT/EP2015/067648, European Patent Office, dated Oct. 13, 2015.
International Search Report and Written Opinion for International Application No. PCT/EP2015/067632, European Patent Office, dated Oct. 9, 2015.
International Search Report and Written Opinion for International Application No. PCT/EP2015/067646, European Patent Office, dated Oct. 13, 2015.
International Search Report and Written Opinion for International Application No. PCT/EP2015/067651, European Patent Office, dated Oct. 14, 2015.

(Continued)

*Primary Examiner* — David J Buttner
(74) *Attorney, Agent, or Firm* — K & L Gates LLP

(57) ABSTRACT

The invention relates to copolycarbonate compositions having cyclic and linear oligomers and improved optical properties, to their use for producing blends and moldings and to moldings obtained therewith. The copolycarbonate compositions comprise (A) 5% to 99% by weight, based on the total weight of the copolycarbonate composition, of a copolycarbonate containing one or more monomer units of the formula (1)

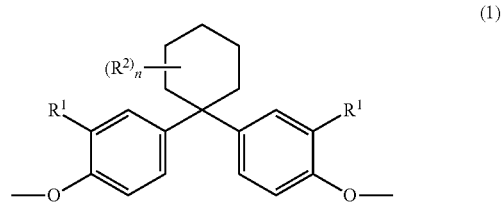

(1)

wherein $R^1$ is hydrogen or $C_1$-$C_4$-alkyl, $R^2$ is $C_1$-$C_4$-alkyl, and n is 0, 1, 2 or 3 and (B) 95% to 1% by weight, based on the total weight of the copolycarbonate composition, of a (co)polycarbonate containing one or more monomer units of the general formula (2)

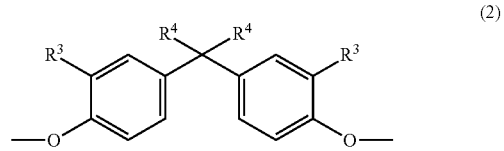

(2)

wherein $R^3$ is H or linear or branched $C_1$-$C_{10}$ alkyl and $R^4$ is linear or branched C1-C10 alkyl.

14 Claims, No Drawings

(56) References Cited

FOREIGN PATENT DOCUMENTS

WO    WO 2008002721 A1    1/2008
WO    WO 2013045552 A1    4/2013

OTHER PUBLICATIONS

P. Kilz, R.-P. Krüger, H. Much, and G. Schultz. Two-Dimensional Chromatography for the Deformulation of Complex Copolymers. Chromatographic Characterization of Polymers Advances in Chemistry. American Chemical Society. Chapter 17. 223-241. 1995.

D. Brunelle. Cyclic Oligomer Chemistry. Journal of Polymer Science: Part A: Polymer Chemistry. Wiley Periodicals, Inc. vol. 46. 1151-1164. 2008.

D. Brunelle and T. Shannon. Preparation and Polymerization of Bisphenol A Cyclic Oligomeric Carbonates. Macromolecules. American Chemical Society. 24. 3035-3044. 1991.

\* cited by examiner

ID CARBONATE COMPOSITIONS
WITH CYCLIC AND LINEAR OLIGOMERS
AND IMPROVED OPTICAL PROPERTIES

CROSS-REFERENCE TO RELATED APPLICATIONS

This application is a U.S. national stage application, filed under 35 U.S.C. § 371, of PCT/EP2015/067648, which was filed on Jul. 31, 2015, and which claims priority to European Patent Application No. EP 14179572.4, which was filed on Aug. 1, 2014, the contents of each of which are incorporated by reference into this specification. The present application is also related to the following commonly-owned U.S. Patent Applications filed on Feb. 1, 2017, and which are hereby incorporated by reference in their entirety:

(1) U.S. patent application Ser. No. 15/501,082, entitled COPOLYCARBONATE COMPOSITIONS WITH BRANCH STRUCTURES AND CYCLIC OLIGOMERS AND IMPROVED RHEOLOGICAL PROPERTIES;
(2) U.S. patent application Ser. No. 15/501,089, entitled COPOLYCARBONATE COMPOSITIONS WITH CYCLIC AND LINEAR OLIGOMERS AND IMPROVED RHEOLOGICAL PROPERTIES and
(3) U.S. patent application Ser. No. 15/501,050, entitled COPOLYCARBONATE COMPOSITIONS WITH BRANCH STRUCTURES AND LINEAR OLIGOMERS AND IMPROVED RHEOLOGICAL PROPERTIES.

FIELD

This invention provides copolycarbonate compositions having cyclic and linear oligomers, which have improved optical properties, and for the use thereof for production of blends and moldings and moldings obtainable therefrom.

BACKGROUND

Copolycarbonates form part of the group of the technical thermoplastics. They find a variety of uses in the electrical and electronics sector, as a housing material for lights, and in applications where exceptional thermal and mechanical properties are required, for example hairdryers, applications in the automotive sector, plastic covers, headlamp lenses or light guide elements, and also lamp covers or lamp bezels. These copolycarbonates can be used as a blending partner for further thermoplastic polymers.

In the case of these compositions, it is virtually always the case that good thermal and mechanical properties such as a high Vicat temperature (heat distortion resistance) and glass transition temperature are an absolute requirement.

As well as the good thermal and mechanical properties of polycarbonates, high transparency and low intrinsic yellowness (yellowness index, YI) are a further core property of polycarbonates. These good optical properties have to be maintained even over a prolonged period. This is particularly true of the thermal aging characteristics of components. In other words, the long-term performance under thermal stress of (co-)polycarbonates is a crucial quality criterion of great significance for the use of (co-)polycarbonate compositions for industrial components. If this criterion is not fulfilled, the (co-)polycarbonate composition and hence the component are subject to significant thermal yellowing, which is unwanted.

WO 2013/045552 discloses compositions comprising a copolycarbonate based on bisphenol A and 1,1-bis(4-hydroxyphenyl)-3,3,5-trimethylcyclohexane (bisphenol TMC).

EP 0 953 605 describes linear polycarbonate compositions having improved flow characteristics, characterized in that cyclic oligocarbonates are added in large amounts, for example 0.5% to 4%, and are homogenized by means of a twin-screw extruder in the matrix of a linear BPA polycarbonate at 285° C. In this case, flowability increases with increasing amount of cyclic oligocarbonates. However, this application says nothing about the thermal stability of corresponding polycarbonates.

EP 2 411 473 describes the use of polyacrylates containing imide structures for improvement of transmission.

WO 2009/056421 describes the use of polyethers which can likewise bring about an improvement. However, polyethers have too low an intrinsic thermal stability for use as blend partners in high-temperature polycarbonates.

SUMMARY

The problem addressed was therefore that of finding compositions comprising aromatic polycarbonates and having improved optical properties, especially low yellowing after heat storage with virtually the same heat distortion resistance.

However, the person skilled in the art does not find any pointer in the prior art as to how the optical properties of (co)polycarbonate compositions or PC blends which are produced in a compounding step can be improved with a given/defined heat distortion resistance. More particularly, there is no pointer with regard to the influence of the blend component, specifically the influence of specific oligomer structures present in particular amounts in at least one, on the flowability of the overall mixture.

It has been found that, surprisingly, compositions composed of specific (high-Tg) copolycarbonates (component A; $T_g$: glass transition temperature) with a further (co)polycarbonate (component B) have improved optical properties whenever specific oligomer structures are present in component B or in both components.

This is surprisingly true of mixtures in a very large mixing ratio of the blend partners.

The novel combinations of properties described are an important criterion for the mechanical and thermal performance of the injection-molded/extruded component. Injection moldings or extrudates produced from the copolycarbonate compositions according to the invention have significantly improved flow properties without any deterioration in the thermal properties.

DETAILED DESCRIPTION

Copolycarbonate compositions or blends in the context of this application are understood to mean mixtures of at least one copolycarbonates and at least one further copolycarbonate or polycarbonate which may optionally be provided with additives (component C).

The present invention therefore provides copolycarbonate compositions comprising, as component A) 5% to 99% by weight of a copolycarbonate containing one or more monomer units of the formula (1)

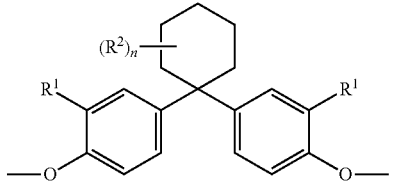

in which

R$^1$ is hydrogen or C$_1$-C$_4$-alkyl, preferably hydrogen,

R$^2$ is C$_1$-C$_4$-alkyl, preferably methyl, n is 0, 1, 2 or 3, preferably 3;

as component

B) 95% to 1% by weight of a (co)polycarbonate containing one or more monomer units of the general formula (2):

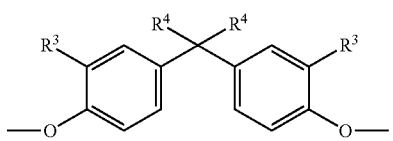

in which R$^3$ is H, linear or branched C$_1$-C$_{10}$ alkyl, preferably linear or branched C$_1$-C$_6$ alkyl, more preferably linear or branched C$_1$-C$_4$ alkyl, most preferably H or C$_1$-alkyl (methyl);

and in which R$^4$ is linear or branched C$_1$-C$_{10}$ alkyl, preferably linear or branched C$_1$-C$_6$ alkyl, more preferably linear or branched C$_1$-C$_4$ alkyl, most preferably C$_1$-alkyl (methyl), and wherein the (co)polycarbonate of component B) does not have any monomer units of the formula (1) and the sum total of the percentages by weight of components A and B in the composition is 100% by weight;

characterized in that component B contains at least one cyclic oligomer of the general formula (I) in a total amount of at least 1.00% by weight, based on the weight of component B

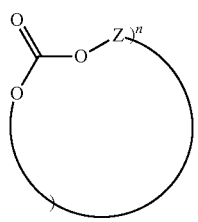

where n is an integer from 2 to 6, and

Z is a radical of the formula (Ia)

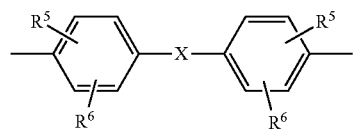

in which

R$^5$ and R$^6$ are each independently H, C$_1$-C$_8$-alkyl, preferably H or C$_1$-C$_4$-alkyl, more preferably hydrogen or methyl, and X is a single bond, C$_1$- to C$_6$-alkylene, C$_2$- to C$_5$-alkylidene or C$_5$- to C$_6$-cycloalkylidene, which may be substituted by C$_1$- to C$_6$-alkyl, preferably methyl or ethyl, preferably a single bond or isopropylidene;

and component B contains one or more linear oligomers of the general formulae (II), (III), (IV), (V) and/or (VI) in a total amount of 0.50% by weight to 1.40% by weight, based on the weight of component B,

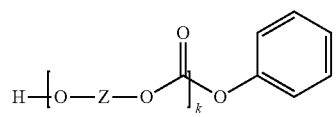

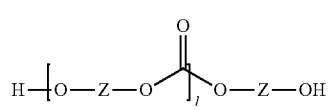

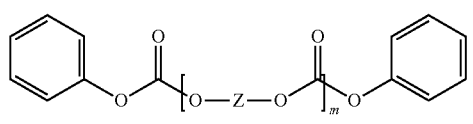

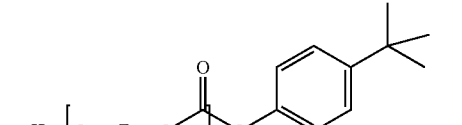

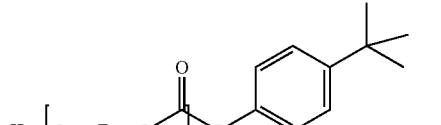

where k, l, m, o and p are each independently an integer from 1 to 6 and Z is the radical of formula (Ia) already defined, wherein the amounts of the structures (I) and (II) to (VI) can be determined by precipitation and subsequent quantitative HPLC.

Definitions

C$_1$-C$_4$-Alkyl in the context of the invention is, for example, methyl, ethyl, n-propyl, isopropyl, n-butyl, sec-butyl, tert-butyl, C$_1$-C$_6$-alkyl is additionally, for example, n-pentyl, 1-methylbutyl, 2-methylbutyl, 3-methylbutyl, neopentyl, 1-ethylpropyl, cyclohexyl, cyclopentyl, n-hexyl, 1,1- dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, $C_1$-$C_{10}$-alkyl is additionally, for example, n-heptyl and n-octyl, pinacyl, adamantyl, the isomeric menthyls, n-nonyl, n-decyl, $C_1$-$C_{34}$-alkyl is additionally, for example, n-dodecyl, n-tridecyl, n-tetradecyl, n-hexadecyl or n-octadecyl. The same applies to the corresponding alkyl radical, for example, in aralkyl/alkylaryl, alkylphenyl or alkylcarbonyl radicals. Alkylene radicals in the corresponding hydroxyalkyl or aralkyl/alkylaryl radicals are, for example, the alkylene radicals corresponding to the above alkyl radicals.

Aryl is a carbocyclic aromatic radical having 6 to 34 skeleton carbon atoms. The same applies to the aromatic moiety of an arylalkyl radical, also called aralkyl radical, and to the aryl constituents of more complex groups, for example arylcarbonyl radicals.

Examples of $C_6$-$C_{34}$-aryl are phenyl, o-, p-, m-tolyl, naphthyl, phenanthrenyl, anthracenyl or fluorenyl.

Arylalkyl/aralkyl is in each case independently a straight-chain, cyclic, branched or unbranched alkyl radical as defined above, which may be singly, multiply or polysubstituted by aryl radicals as defined above.

The above enumerations should be understood by way of example and not as a limitation.

In the context of the present invention, ppb and ppm—unless stated otherwise—are understood to mean parts by weight.

Oligomers

The amounts of the linear oligomers and of the cyclic oligomers can be determined as follows: a sample of the polycarbonate composition is dissolved in methylene chloride. By adding acetone, the predominant proportion of the polymer is precipitated. The undissolved fractions are filtered off; the filtrate is concentrated to dryness. The dry residue is dissolved with THF and the oligomers are determined by HPLC (high pressure liquid chromatography) with UV detection.

The cyclic oligomers of the general formula (I) are present in component B (based in each case on the total weight of component B and determined by precipitation and subsequent quantitative HPLC) in a total amount of at least 1.00% by weight, preferably 1.05% by weight to 1.60% by weight, more preferably 1.10% by weight to 1.50% by weight.

Preferably, the most commonly occurring ring sizes are those with n=3 and/or n=4, more preferably n=4.

The total amount of linear oligomers of the general formulae (II), (III), (IV), (V) and (VI) in component B is 0.50% by weight to 1.40% by weight, preferably 0.60% by weight to 1.35% by weight, and more preferably 0.60% by weight to 1.30% by weight (based in each case on the total weight of component B and determined by precipitation and subsequent quantitative HPLC).

Preferably, the total amount of the cyclic oligomers of the general formula (I) and the linear oligomers of the general formulae (II), (III), (IV), (V) and (VI) in component B adds up to at least 2.0% by weight, preferably at least 2.2% by weight, and more preferably at least 2.4% by weight (based in each case on the total weight of component B and determined by precipitation and subsequent quantitative HPLC).

Component A may likewise include one or more cyclic oligomers of the general formula (I).

Component A may also contain one or more linear oligomers of the general formulae (II), (III), (IV), (V) and (VI). Component A The copolycarbonate composition of the invention contains 5% to 99% by weight, preferably 10% to 95% by weight, and more preferably 15% to 90% by weight (based on the sum total of the parts by weight of components A and B), of component A.

The monomer unit(s) of the general formula (1) is/are introduced by means of one or more corresponding diphenols of the general formula (1a):

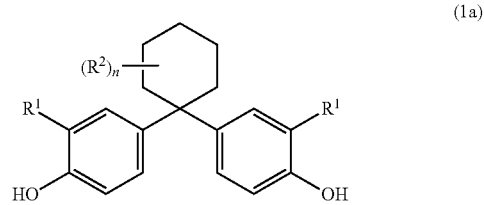

(1a)

in which
R$^1$ is hydrogen or $C_1$-$C_4$-alkyl, preferably hydrogen,
R$^2$ is $C_1$-$C_4$-alkyl, preferably methyl, and
n is 0, 1, 2 or 3, preferably 3.

The diphenols of the formulae (1a) for use in accordance with the invention and the use thereof in homopolycarbonates are known to some degree in the literature (DE 3918406).

Particular preference is given to 1,1-bis(4-hydroxyphenyl)-3,3,5-trimethylcyclohexane (bisphenol TMC) having the formula (1b):

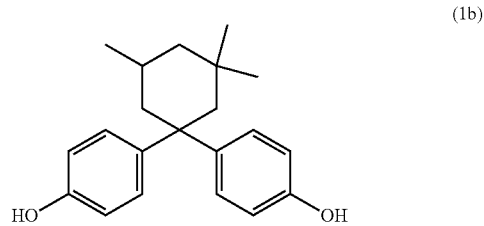 [SMILES: CC1CC(C)(C)CC(c2ccc(O)cc2)(c2ccc(O)cc2)C1]

(1b)

As well as one or more monomer units of the formulae (1), one or more monomer unit(s) of the formula (4) may be present in component A:

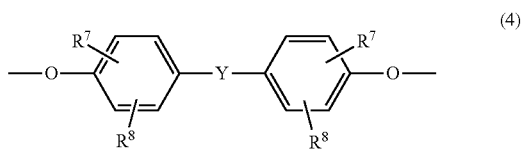

(4)

in which
R$^7$ and R$^8$ are each independently H, $C_1$-$C_{18}$-alkyl, $C_1$-$C_{18}$-alkoxy, halogen such as Cl or Br or in each case optionally substituted aryl or aralkyl, preferably H or $C_1$-$C_{12}$-alkyl, more preferably H or $C_1$-$C_8$-alkyl and most preferably H or methyl, and
Y is a single bond, —SO$_2$—, —CO—, —O—, —S—, $C_1$-$C_6$-alkylene or $C_2$-$C_5$-alkylene, or else $C_6$-$C_{12}$- arylene which may optionally be fused to further aromatic rings containing heteroatoms.

The monomer unit(s) of the general formula (4) is/are introduced via one or more corresponding diphenols of the general formula (4a):

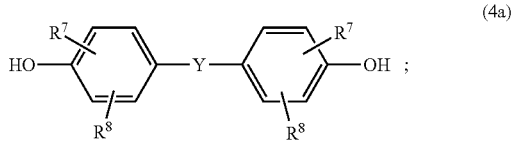

(4a)

where $R^7$, $R^8$ and Y are each as already defined in connection with the formula (4).

Examples of the diphenols of the formula (4a) which can be used in addition to the diphenols of the formula (1a) include hydroquinone, resorcinol, dihydroxybiphenyls, bis(hydroxyphenyl)alkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)-diisopropylbenzenes, and the ring-alkylated and ring-halogenated compounds thereof, and also α,ω-bis(hydroxyphenyl)polysiloxanes.

Preferred diphenols of the formula (4a) are, for example, 4,4'-dihydroxybiphenyl (DOD), 4,4'-dihydroxybiphenyl ether (DOD ether), 2,2-bis(4-hydroxyphenyl)propane (bisphenol A), 2,4-bis(4-hydroxyphenyl)-2-methylbutane, 1,1-bis(4-hydroxyphenyl)-1-phenylethane, 1,1-bis[2-(4-hydroxyphenyl)-2-propyl]benzene, 1,3-bis[2-(4-hydroxyphenyl)-2-propyl]benzene (bisphenol M), 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 2,2-bis(3,5-dichloro-4-hydroxyphenyl)propane and 2,2-bis(3,5-dibromo-4-hydroxyphenyl)propane.

Particularly preferred diphenols are, for example, 2,2-bis(4-hydroxyphenyl)propane (bisphenol A), 4,4'-dihydroxybiphenyl (DOD), 4,4'-dihydroxybiphenyl ether (DOD ether), 1,3-bis[2-(4-hydroxyphenyl)-2-propyl]benzene (bisphenol M), 2,2-bis(3,5-dimethyl-4-hydroxyphenyl)propane, 1,1-bis(4-hydroxyphenyl)-1-phenylethane, 2,2-bis(3,5-dichloro-4-hydroxyphenyl)propane and 2,2-bis(3,5-dibromo-4-hydroxyphenyl)propane.

Very particular preference is given to compounds of the general formula (4b)

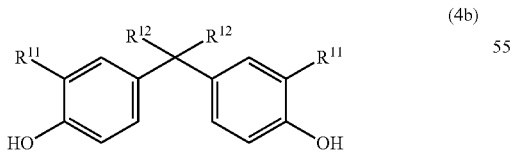

(4b)

in which $R^{11}$ is H, linear or branched $C_1$-$C_{10}$-alkyl, preferably linear or branched $C_1$-$C_6$-alkyl, more preferably linear or branched $C_1$-$C_4$-alkyl, most preferably H or $C_1$-alkyl (methyl) and in which $R^{12}$ is linear or branched $C_1$-$C_{10}$-alkyl, preferably linear or branched $C_1$-$C_6$-alkyl, more preferably linear or branched $C_1$-$C_4$-alkyl, most preferably $C_1$-alkyl (methyl).

Very particular preference is given here to the diphenol (4c).

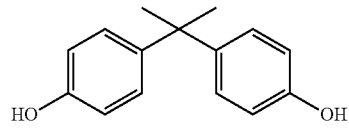

(4c)

The diphenols of the general formulae (4a) can be used either alone or in a mixture with one another. The diphenols are known from the literature or preparable by methods known from the literature (see, for example, H. J. Buysch et al., Ullmann's Encyclopedia of Industrial Chemistry, VCH, New York 1991, 5th ed., vol. 19, p. 348).

The proportion of the monomer units of the formula (1) in the copolycarbonate is preferably 0.1-88 mol %, more preferably 1-86 mol %, even more preferably 5-84 mol % and especially 10-82 mol % (based on the sum total of the moles of diphenols used).

The preferred diphenoxide units of the copolycarbonates of component A derive from monomers having the general structures of the above-described formulae (1a) and (4a), particular preference being given to the combination of the bisphenols (1b) and (4c).

The copolycarbonate component of the copolycarbonate compositions may take the form of a block and random copolycarbonate. Particular preference is given to random copolycarbonates.

The ratio of the frequency of the diphenoxide monomer units in the copolycarbonate is calculated from the molar ratio of the diphenols used.

Component B

The copolycarbonate composition of the invention contains 95% to 1% by weight, preferably 90% to 5% by weight, and more preferably 85% to 10% by weight (based on the sum total of the parts by weight of components A, B and C), of component B.

Component B is a polycarbonate or a copolycarbonate. (Co)polycarbonates in the context of the present invention are both homopolycarbonates and copolycarbonates.

The monomer unit(s) of the general formula (2) are introduced by means of one or more corresponding diphenols of the general formula (2a):

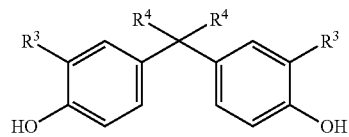

(2a)

in which $R^3$ is H, linear or branched $C_1$-$C_{10}$-alkyl, preferably linear or branched $C_1$-$C_6$-alkyl, more preferably linear or branched $C_1$-$C_4$-alkyl, most preferably H or $C_1$-alkyl (methyl) and in which $R^4$ is linear or branched $C_1$-$C_{10}$-alkyl, preferably linear or branched $C_1$-$C_6$-alkyl, more preferably linear or branched $C_1$-$C_4$-alkyl, most preferably $C_1$-alkyl (methyl).

Very particular preference is given here to the diphenol (4c).

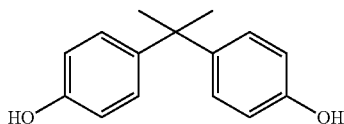

(4c)

As well as one or more monomer units of the general formulae (2), one or more monomer units of the formula (4) as already described for component A may be present.

More preferably, component B is based exclusively on the bisphenol (4c).

The copolycarbonate compositions of the invention, given specific ratios of the components A and B, have improved optical properties (lower yellowing) of the copolycarbonate compositions thus obtained, with a high heat distortion resistance in spite of a higher melt viscosity.

This is especially true of compositions in which component B is present in a concentration of not less than 50% by weight and component B contains a chain terminator containing alkyl groups, preferably of the formula (3b).

Preparation Process

Preferred modes of preparation of the (co)polycarbonates which are used with preference as component A and B in the composition of the invention, including the (co)polyester-carbonates, are the interfacial method and the melt transesterification method, preference being given to preparing at least one of components A and B by the interfacial method.

In a preferred embodiment, at least component A, preferably components A and B, is/are prepared by the interfacial method.

To obtain (co)polycarbonates of relatively high molecular weight by the interfacial method, the alkali metal salts of diphenols are reacted with phosgene in a biphasic mixture. The molecular weight can be controlled via the amount of monophenols, which act as chain terminators, for example phenol, tert-butylphenol or cumylphenol, more preferably phenol, tert-butylphenol. These reactions give rise to virtually exclusively linear polymers. This can be detected by end group analysis. Through controlled use of what are called branching agents, generally polyhydroxylated compounds, branched polycarbonates are also obtained.

Branching agents used may be small amounts, preferably amounts between 0.05 and 5 mol %, more preferably 0.1-3 mol %, most preferably 0.1-2 mol %, based on the moles of diphenols used, of trifunctional compounds, for example isatin biscresol (IBC) or phloroglucinol, 4,6-dimethyl-2,4,6-tri(4-hydroxyphenyl)hept-2-ene; 4,6-dimethyl-2,4,6-tri-(4-hydroxyphenyl)heptane; 1,3,5-tri(4-hydroxyphenyl)benzene; 1,1,1-tri(4-hydroxyphenyl)ethane (THPE); tri(4-hydroxyphenyl)-phenylmethane; 2,2-bis[4,4-bis(4-hydroxyphenyl)cyclohexyl]propane; 2,4-bis(4-hydroxyphenyl-isopropyl)phenol; 2,6-bis(2-hydroxy-5'-methylbenzyl)-4-methylphenol; 2-(4-hydroxyphenyl)-2-(2,4-dihydroxyphenyl)propane; hexa-(4-(4-hydroxyphenylisopropyl)phenyl) orthoterephthalate; tetra(4-hydroxyphenyl)methane; tetra(4-(4-hydroxyphenylisopropyl)phenoxy)methane; α,α',α'''-tris(4-hydroxyphenyl)-1,3,5-triisopropylbenzene; 2,4-dihydroxybenzoic acid; trimesic acid; cyanuric chloride; 3,3-bis(3-methyl-4-hydroxyphenyl)-2-oxo-2,3-dihydroindole; 1,4-bis(4',4"-di-hydroxytriphenyl)methyl)benzene and especially; 1,1,1-tri(4-hydroxyphenyl)ethane (THPE) and bis(3-methyl-4-hydroxyphenyl)-2-oxo-2,3-dihydroindole.

Preference is given to using isatin biscresol, and also 1,1,1-tri(4-hydroxyphenyl)ethane (THPE) and bis(3-methyl-4-hydroxyphenyl)-2-oxo-2,3-dihydroindol, as branching agents.

The use of these branching agents gives rise to branched structures. The resulting long-chain branching usually leads to rheological properties of the polycarbonates obtained that are manifested in structural viscosity compared to linear types.

The amount of chain terminator to be used is preferably 0.5 mol % to 10 mol %, more preferably 1 mol % to 8 mol %, especially preferably 2 mol % to 6 mol %, based on moles of diphenols used in each case. The chain terminators can be added before, during or after the phosgenation, preferably as a solution in a solvent mixture of methylene chloride and chlorobenzene (of strength 8%-15% by weight).

To obtain (co)polycarbonates of high molecular weight by the melt transesterification method, diphenols are reacted in the melt with carbonic diesters, usually diphenyl carbonate, in the presence of catalysts, such as alkali metal salts or ammonium or phosphonium compounds.

The melt transesterification method is described, for example, in the Encyclopedia of Polymer Science, vol. 10 (1969), Chemistry and Physics of Polycarbonates, Polymer Reviews, H. Schnell, vol. 9, John Wiley and Sons, Inc. (1964), and also DE-C 10 31 512.

In the melt transesterification method, diphenols of the formulae (2a) and optionally (1a) are transesterified with carbonic diesters with the aid of suitable catalysts and optionally further additives in the melt.

Carbonic diesters in the context of the invention are those of the formulae (5) and (6)

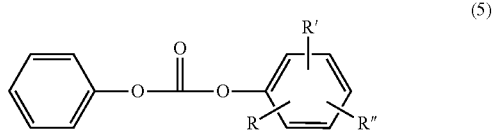

(5)

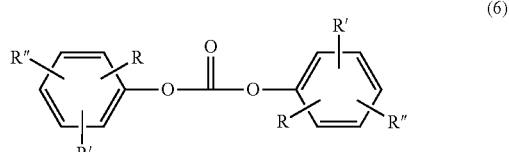

(6)

where
R, R' and R" are each independently H, optionally branched $C_1$-$C_{34}$-alkyl/cycloalkyl, $C_7$-$C_{34}$-alkaryl or $C_6$-$C_{34}$-aryl, for example diphenyl carbonate, butylphenyl phenyl carbonate, di(butylphenyl) carbonate, isobutylphenyl phenyl carbonate, di(isobutylphenyl) carbonate, tert-butylphenyl phenyl carbonate, di(tert-butylphenyl) carbonate, n-pentylphenyl phenyl carbonate, di(n-pentylphenyl) carbonate, n-hexylphenyl phenyl carbonate, di(n-hexylphenyl) carbonate, cyclohexylphenyl phenyl carbonate, di(cyclohexylphenyl) carbonate, phenylphenol phenyl carbonate, di(phenylphenol) carbonate, isooctylphenyl phenyl carbonate, di(isooctylphenyl) carbonate, n-nonylphenyl phenyl carbonate, di(n-nonylphenyl) carbonate, cumylphenyl phenyl carbonate, di(cumylphenyl) carbonate, naphthylphenyl phenyl carbonate, di(naphthylphenyl) carbonate, di-tert-butylphenyl phenyl carbonate, di(di-tert-butylphenyl) carbonate, dicumylphenyl phenyl carbonate, di(dicumylphenyl) carbonate, 4-phenoxyphenyl phenyl carbonate, di(4-phenoxyphenyl) carbonate, 3-pentadecylphenyl phenyl carbonate, di-(3-pentadecylphenyl) carbonate, tritylphenyl phenyl carbonate, di(tritylphenyl) carbonate, preferably diphenyl carbonate, tert-butylphenyl phenyl carbonate, di-(tert-butylphenyl) carbonate, phenylphenol phenyl carbonate, di(phenylphenol) carbonate, cumylphenyl phenyl carbonate, di(cumylphenyl) carbonate, more preferably diphenyl carbonate.

It is also possible to use mixtures of the carbonic diesters mentioned.

The proportion of carbonic esters is 100 to 130 mol %, preferably 103 to 120 mol %, more preferably 103 to 109 mol %, based on the one or more diphenols.

Catalysts used in the melt transesterification method, as described in the literature cited, are basic catalysts, for example alkali metal and alkaline earth metal hydroxides and oxides, but also ammonium or phosphonium salts, referred to hereinafter as onium salts. Preference is given here to using onium salts, more preferably phosphonium salts. Phosphonium salts in the context of the invention are those of the following general formula (7)

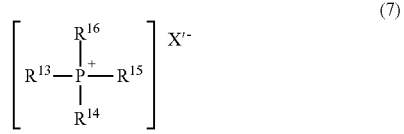

(7)

where $R^{13-16}$ may be identical or different $C_1$-$C_{10}$-alkyls, $C_6$-$C_{10}$-aryls, $C_7$-$C_{10}$-aralkyls or $C_5$-$C_6$-cycloalkyls, preferably methyl or $C_6$-$C_{14}$-aryls, more preferably methyl or phenyl, and $X'^-$ may be an anion such as hydroxide, sulfate, hydrogensulfate, hydrogencarbonate, carbonate, a halide, preferably chloride, or an alkoxide of the formula $OR^{17}$ where $R^{17}$ may be $C_6$-$C_{14}$-aryl or $C_7$-$C_{12}$-aralkyl, preferably phenyl.

Preferred catalysts are tetraphenylphosphonium chloride, tetraphenylphosphonium hydroxide, tetraphenylphosphonium phenoxide, more preferably tetraphenylphosphonium phenoxide.

The catalysts are preferably used in amounts of $10^{-8}$ to $10^{-3}$ mol, based on one mole of diphenol, more preferably in amounts of $10^{-7}$ to $10^{-4}$ mol.

Further catalysts can be used alone or optionally in addition to the onium salt, in order to increase the rate of polymerization. These include salts of alkali metals and alkaline earth metals, such as hydroxides, alkoxides and aryloxides of lithium, sodium and potassium, preferably hydroxide, alkoxide or aryloxide salts of sodium. Most preferred are sodium hydroxide and sodium phenoxide. The amount of the cocatalyst may be in the range from 1 to 200 ppb, preferably 5 to 150 ppb and most preferably 10 to 125 ppb, in each case calculated as sodium.

The catalysts are added in solution, in order to avoid excess concentrations which are harmful in the course of metered addition. The solvents are compounds that are inherent to the system and process, for example diphenol, carbonic diesters or monohydroxyaryl compounds. Particular preference is given to monohydroxyaryl compounds, because it is well known to the person skilled in the art that the diphenols and carbonic diesters readily undergo change and decomposition at even slightly elevated temperatures, especially under catalysis. This affects the polycarbonate qualities. In the industrially important transesterification method for preparation of polycarbonate, the preferred compound is phenol. Phenol is an obvious option merely because the tetraphenylphosphonium phenoxide catalyst used with preference, when prepared, is isolated as a cocrystal with phenol.

The process for preparing the (co)polycarbonates present in the composition of the invention by the transesterification method can be configured batchwise or else continuously. After the diphenols of the formulae (2a) and optionally (1a) and carbonic diesters are present in molten form, optionally with further compounds, the reaction is started in the presence of the catalyst. The conversion or molecular weight is increased with rising temperatures and falling pressures in suitable apparatuses and devices by removing the monohydroxyaryl compound which is eliminated until the desired final state has been obtained. Choice of the ratio of diphenol to carbonic diester and of the rate of loss of the carbonic diester via the vapors and of any added compounds, for example of a higher-boiling monohydroxyaryl compound, said rate of loss arising through choice of procedure and the plant for preparation of the polycarbonate, is what decides the end groups in terms of their nature and concentration.

With regard to the manner in which, the plant in which and the procedure by which the process is executed, there is no limitation or restriction.

Moreover, there is no specific limitation and restriction with regard to the temperatures, the pressures and catalysts used, in order to conduct the melt transesterification reaction between the diphenol and the carbonic diester, and also any other reactants added. Any conditions are possible, provided that the temperatures, pressures and catalysts chosen enable a melt transesterification with correspondingly rapid removal of the monohydroxyaryl compound eliminated.

The temperatures over the entire process are generally 180 to 330° C. at pressures of 15 bar, absolute, to 0.01 mbar, absolute.

It is usually a continuous procedure that is chosen, because this is advantageous for the product quality.

Preferably, the continuous process for preparing polycarbonates is characterized in that one or more diphenols with the carbonic diester, and also any other reactants added, using the catalysts, after pre-condensation, without removing the monohydroxyaryl compound formed, in several reaction evaporator stages which then follow at temperatures rising stepwise and pressures falling stepwise, the molecular weight is built up to the desired level.

The devices, apparatuses and reactors that are suitable for the individual reaction evaporator stages are, in accordance with the process sequence, heat exchangers, flash apparatuses, separators, columns, evaporators, stirred vessels and reactors or other purchasable apparatuses which provide the necessary residence time at selected temperatures and pressures. The devices chosen must enable the necessary input of heat and be constructed such that they are able to cope with the constantly increasing melt viscosities.

All devices are connected to one another by pumps, pipelines and valves. The pipelines between all the devices should of course be as short as possible and the curvature of the conduits should be kept as low as possible, in order to avoid unnecessarily prolonged residence times. At the same time, the external, i.e. technical, boundary conditions and requirements for assemblies of chemical plants should be observed.

For performance of the process by a preferred continuous procedure, the coreactants can either be melted together or else the solid diphenol can be dissolved in the carbonic diester melt or the solid carbonic diester can be dissolved in the melt of the diphenol, or the two materials are combined in molten form, preferably directly from their preparation. The residence times of the separate melts of the raw materials, especially the residence time of the melt of the diphenol, are adjusted so as to be as short as possible. The melt mixture, by contrast, because of the depressed melting point of the raw material mixture compared to the individual raw materials, can reside for longer periods at correspondingly lower temperatures without loss of quality.

Thereafter, the catalyst, preferably dissolved in phenol, is mixed in and the melt is heated to the reaction temperature. At the start of the industrially important process for preparing polycarbonate from 2,2-bis(4-hydroxyphenyl)propane and diphenyl carbonate, this temperature is 180 to 220° C., preferably 190 to 210° C., most preferably 190° C. Over the course of residence times of 15 to 90 min, preferably 30 to 60 min, the reaction equilibrium is established without withdrawing the hydroxyaryl compound formed. The reaction can be run at atmospheric pressure, but for technical reasons also at elevated pressure. The preferred pressure in industrial plants is 2 to 15 bar absolute.

The melt mixture is expanded into a first vacuum chamber, the pressure of which is set to 100 to 400 mbar, preferably to 150 to 300 mbar, and then heated directly back to the inlet temperature at the same pressure in a suitable device. In the expansion operation, the hydroxyaryl compound formed is evaporated together with monomers still present. After a residence time of 5 to 30 min in a bottoms reservoir, optionally with pumped circulation, at the same pressure and the same temperature, the reaction mixture is expanded into a second vacuum chamber, the pressure of which is 50 to 200 mbar, preferably 80 to 150 mbar, and then heated directly in a suitable apparatus at the same pressure to a temperature of 190 to 250° C., preferably 210 to 240° C., more preferably 210 to 230° C. Here too, the hydroxyaryl compound formed evaporates together with monomers still present. After a residence time of 5 to 30 min in a bottoms reservoir, optionally with pumped circulation, at the same pressure and the same temperature, the reaction mixture is expanded into a third vacuum chamber, the pressure of which is 30 to 150 mbar, preferably 50 to 120 mbar, and then heated directly in a suitable apparatus at the same pressure to a temperature of 220 to 280° C., preferably 240 to 270° C., more preferably 240 to 260° C. Here too, the hydroxyaryl compound is evaporated together with monomers still present. After a residence time of 5 to 20 min in a bottoms reservoir, optionally with pumped circulation, at the same pressure and the same temperature, the reaction mixture is expanded into a further vacuum chamber, the pressure of which is 5 to 100 mbar, preferably 15 to 100 mbar, more preferably 20 to 80 mbar and then heated directly in a suitable apparatus at the same pressure to a temperature of 250 to 300° C., preferably 260 to 290° C., more preferably 260 to 280° C. Here too, the hydroxyaryl compound formed evaporates together with monomers still present.

The number of these stages, 4 here by way of example, may vary between 2 and 6. The temperatures and pressures should be adjusted appropriately when the number of stages is altered, in order to obtain comparable results. The relative viscosity of the oligomeric carbonate attained in these stages is between 1.04 and 1.20, preferably between 1.05 and 1.15, more preferably between 1.06 to 1.10.

The oligocarbonate thus obtained, after a residence time of 5 to 20 min in a bottoms reservoir, optionally with pumped circulation, at the same pressure and the same temperature as in the last flash/evaporator stage, is conveyed into a disk or cage reactor and subjected to further condensation at 250 to 310° C., preferably 250 to 290° C., more preferably 250 to 280° C., at pressures of 1 to 15 mbar, preferably 2 to 10 mbar, with residence times of 30 to 90 min, preferably 30 to 60 min. The product attains a relative viscosity of 1.12 to 1.28, preferably 1.13 to 1.26, more preferably 1.13 to 1.24.

The melt leaving this reactor is brought to the desired final viscosity or final molecular weight in a further disk or cage reactor. The temperatures are 270 to 330° C., preferably 280 to 320° C., more preferably 280 to 310° C., and the pressure is 0.01 to 3 mbar, preferably 0.2 to 2 mbar, with residence times of 60 to 180 min, preferably 75 to 150 min. The relative viscosities are set to the level necessary for the application envisaged and are 1.18 to 1.40, preferably 1.18 to 1.36, more preferably 1.18 to 1.34.

The function of the two cage reactors or disk reactors can also be combined in one cage reactor or disk reactor.

The vapors from all the process stages are directly led off, collected and processed. This processing is generally effected by distillation, in order to achieve high purities of the substances recovered.

This can be effected, for example, according to German patent application no. 10 100 404. Recovery and isolation of the monohydroxyaryl compound eliminated in ultrapure form is an obvious aim from an economic and environmental point of view. The monohydroxyaryl compound can be used directly for preparation of a diphenol or a carbonic diester.

It is a feature of the disk or cage reactors that they provide a very large, constantly renewing surface under reduced pressure with high residence times. The disk or cage reactors have a geometric shape in accordance with the melt viscosities of the products. Suitable examples are reactors as described in DE 44 47 422 C2 and EP A 1 253 163, or twin shaft reactors as described in WO A 99/28 370.

The oligocarbonates, including those of very low molecular weight, and the finished polycarbonates are generally conveyed by means of gear pumps, screws of a wide variety of designs or positive displacement pumps of a specific design.

Analogously to the interfacial method, it is possible to use polyfunctional compounds as branching agents.

The relative solution viscosity of the poly- or copolycarbonates present in the composition of the invention, determined according to DIN 51562, is preferably in the range of 1.15-1.35.

The weight-average molecular weights of poly- or copolycarbonates present in the composition of the invention are preferably 15 000 to 40 000 g/mol, more preferably 17 000 to 36 000 g/mol, and most preferably 17 000 to 34 000 g/mol, and are determined by GPC against a polycarbonate calibration.

Particular preference is given to copolycarbonate compositions in which component A and/or component B contain, at least in part, as end group, a structural unit of the formula (3a) and/or a structural unit of the formula (3b).

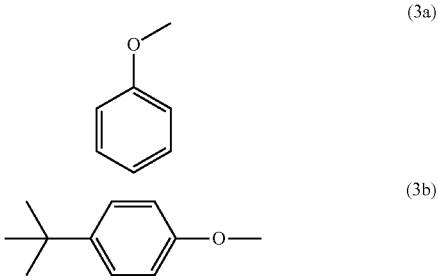

(3a)

(3b)

Component C

The present invention further provides compositions comprising components A and B and optionally, as component C, at least one additive, preferably selected from the group of the additives customary for these thermoplastics, such as fillers, carbon black, UV stabilizers, IR stabilizers, thermal stabilizers, antistats and pigments, colorants in the customary amounts; it is optionally possible to improve the demolding characteristics, flow characteristics and/or flame retardancy by adding external demolding agents, flow agents and/or flame retardants, such as sulfonic salts, PTFE polymers or PTFE copolymers, brominated oligocarbonates, or oligophosphates and phosphazenes (e.g. alkyl and aryl phosphites, alkyl and aryl phosphates, alkyl- and arylphosphines, low molecular weight carboxylic esters, halogen compounds, salts, chalk, talc, silicates, boron nitride, thermally or electrically conductive carbon blacks or graphites, quartz/quartz flours, glass fibers and carbon fibers, pigments or else additives for reduction of the coefficient of linear thermal expansion (CLTE) and combination thereof. Compounds of this kind are described, for example, in WO 99/55772, p. 15-25, and in "Plastics Additives", R. Gächter and H. Müller, Hanser Publishers 1983.

The composition contains generally of organic additives 0% to 5.0% by weight, preferably 0.005% to 2.50% by weight, more preferably 0.005% to 1.60% by weight, even more preferably 0.005% to 1.50% by weight, very especially preferably 0.005% to 1.0% by weight (based on the overall composition), of additives.

If inorganic additives are present in the composition, the total amount of organic and inorganic additives may be up to 30% by weight (based on the overall composition).

Any demolding agents added to the compositions according to the invention are preferably selected from the group consisting of pentaerythritol tetrastearate, glycerol monostearate and long-chain fatty acids, for example stearyl stearate and propanediol stearate, and mixtures thereof. The demolding agents are preferably used in amounts of 0.05% by weight to 2.00% by weight, preferably in amounts of 0.1% by weight to 1.0% by weight, more preferably in amounts of 0.15% by weight to 0.60% by weight and most preferably in amounts of 0.20% by weight to 0.50% by weight, based on the total weight of components A, B and C.

Suitable additives are described, for example, in "Additives for Plastics Handbook, John Murphy, Elsevier, Oxford 1999", in "Plastics Additives Handbook, Hans Zweifel, Hanser, Munich 2001".

Suitable antioxidants/thermal stabilizers are, for example: alkylated monophenols, alkylthiomethylphenols, hydroquinones and alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, acylaminophenols, esters of β-(3,5-di-tert-butyl-4-hydroxyphenyl)propionic acid, esters of β-(5-tert-butyl-4-hydroxy-3-methylphenyl)propionic acid, esters of β-(3,5-dicyclohexyl-4-hydroxyphenyl)propionic acid, esters of 3,5-di-tert-butyl-4-hydroxyphenylacetic acid, amides of β-(3,5-di-tert-butyl-4-hydroxyphenyl)propionic acid, suitable thio synergists, secondary antioxidants, phosphites and phosphonites, benzofuranones and indolinones.

Suitable thermal stabilizers are preferably tris(2,4-di-tert-butylphenyl) phosphite (Irgafos 168), tetrakis(2,4-di-tert-butylphenyl)[1,1-biphenyl]-4,4'-diyl bisphosphonite, triisoctyl phosphate (TOF), octadecyl 3-(3,5-di-tert-butyl-4-hydroxyphenyl)propionate (Irganox 1076), bis(2,4-dicumylphenyl)pentaerythritol diphosphite (Doverphos S-9228), bis(2,6-di-tert-butyl-4-methyl-phenyl)pentaerythritol diphosphite (ADK STAB PEP-36) and triphenylphosphine (TPP). They are used alone or in a mixture (e.g. Irganox B900 or Doverphos S-9228 with Irganox B900 or Irganox 1076 or triphenylphosphine (TPP) with triisoctyl phosphate (TOF)). Thermal stabilizers are preferably used in amounts of 0.005% by weight to 2.00% by weight, preferably in amounts of 0.01% by weight to 1.0% by weight, more preferably in amounts of 0.015% by weight to 0.60% by weight and most preferably in amounts of 0.02% by weight to 0.50% by weight, based on the total weight of components A, B and C.

Suitable complexing agents for heavy metals and neutralization of traces of alkalis are o/m-phosphoric acids, fully or partly esterified phosphates or phosphites.

Suitable light stabilizers (UV absorbers) are 2-(2'-hydroxyphenyl)benzotriazoles, 2-hydroxy-benzophenones, esters of substituted and unsubstituted benzoic acids, acrylates, sterically hindered amines, oxamides and 2-(hydroxyphenyl)-1,3,5-triazines or substituted hydroxyalkoxyphenyl, 1,3,5-triazoles, preference being given to substituted benzotriazoles, for example 2-(2'-hydroxy-5'-methyl-phenyl)benzotriazole, 2-(2'-hydroxy-3',5'-di-t-butylphenyl)benzotriazole, 2-(2'-hydroxy-3'-tert-butyl-5'-methylphenyl)-5-chlorobenzotriazole, 2-(2'-hydroxy-3',5'-tert-butylphenyl)-5-chlorobenzotriazole, 2-(2'-hydroxy-5'-tert-octylphenyl)benzotriazole, 2-(2'-hydroxy-3',5'-di-tert-amyl-phenyl)benzotriazole, 2-[2'-hydroxy-3'-(3'',4'',5'',6''-tetrahydrophthalimidoethyl)-5'-methylphenyl]-benzotriazole and 2,2'-methylenebis[4-(1,1,3,3-tetramethylbutyl)-6-(2H-benzotriazol-2-yl)phenol].

Further suitable UV stabilizers are selected from the group comprising benzotriazoles (e.g. Tinuvins from BASF), triazine Tinuvin 1600 from BASF), benzophenones (Uvinuls from BASF), cyanoacrylates (Uvinuls from BASF), cinnamic esters and oxalanilides, and mixtures of these UV stabilizers.

The UV stabilizers are used in amounts of 0.01% by weight to 2.0% by weight based on the molding composition, preferably in amounts of 0.05% by weight to 1.00% by weight, more preferably in amounts of 0.08% by weight to 0.5% by weight and most preferably in amounts of 0.1% by weight to 0.4% by weight based on the overall composition.

Polypropylene glycols, alone or in combination with, for example, sulfones or sulfonamides as stabilizers, can be used to counteract damage by gamma rays.

These and other stabilizers can be used individually or in combination and can be added to the polymer in the forms mentioned.

Suitable flame-retardant additives are phosphate esters, i.e. triphenyl phosphate, resorcinol diphosphate, brominated compounds, such as brominated phosphoric esters, brominated oligocarbonates and polycarbonates, and preferably salts of fluorinated organic sulfonic acids.

Suitable impact modifiers are butadiene rubber with grafted-on styrene-acrylonitrile or methyl methacrylate, ethylene-propylene rubbers with grafted-on maleic anhydride, ethyl and butyl acrylate rubbers with grafted-on methyl methacrylate or styrene-acrylonitrile, interpenetrating siloxane and acrylate networks with grafted-on methyl methacrylate or styrene-acrylonitrile.

In addition, it is possible to add colorants such as organic dyes or pigments or inorganic pigments, carbon black, IR absorbers, individually, in a mixture or else in combination with stabilizers, glass fibers, (hollow) glass beads, inorganic fillers, for example titanium dioxide or barium sulfate.

In a particularly preferred embodiment, the composition of the invention comprises at least one additive selected from the group consisting of the thermal stabilizers, the demolding agents and the UV absorbers, preferably in a total amount of 0.2% by weight to 2.0% by weight, based on the total amount of components A, B and C. Particular preference is given to thermal stabilizers.

The copolycarbonate compositions of the invention are produced in standard machines, for example multi-screw extruders, by compounding, optionally with addition of additives and other admixtures, at temperatures between 280° C. and 360° C.

The (co)polycarbonates and copolycarbonate compositions of the invention can be processed in a customary manner in standard machines, for example in extruders or injection molding machines, to give any desired shaped bodies, or moldings to give films or sheets or bottles.

The copolycarbonate compositions of the invention, optionally in a blend with other thermoplastics and/or customary additives, can be used to give any desired shaped bodies/extrudates, wherever already known polycarbonates, polyestercarbonates and polyesters are used:
1. Safety glazing which, as is well known, is required in many regions of buildings, vehicles and aircraft, and as shields of helmets.
2. Production of films and film laminates.
3. Automobile headlamps, bezels, indicators, reflectors.
4. As translucent plastics having a content of glass fibers for lighting purposes. As translucent plastics having a content of barium sulfate, titanium dioxide and/or zirconium oxide or high-reflectance opaque compositions and components produced therefrom.
5. For production of precision injection moldings, for example lenses, collimators, lens holders, light guide elements and LED applications.
6. As electrical insulators for electrical conductors and for plug housings and plug connectors.
7. Housings for electrical appliances.
8. Protective glasses, eyepieces.
9. For medical applications, medical devices, for example oxygenators, dialyzers (hollow fiber dialyzers), 3-way taps, hose connectors, blood filters, injection systems, inhalers, ampoules.
10. Extruded shaped bodies such as sheets and films.
11. LED applications (sockets, reflectors, heat sinks).
12. As a feedstock for compounds or as a blending partner or component in blend compositions and components produced therefrom.

This application likewise provides the compounds, blends, shaped bodies, extrudates, films and film laminates made from the copolycarbonate compositions of the invention, and likewise moldings, extrudates and films comprising coextrusion layers made from the copolycarbonate compositions of the invention.

The examples which follow are intended to illustrate the invention, but without restricting it.

EXAMPLES

Raw Materials Used:
PC 1 is a polycarbonate based on bisphenol A, phenol as chain terminator, with a melt volume flow rate (MVR) of 12.5 cm$^3$/10 min (300° C./1.2 kg), and a total content of cyclic oligomers of the formula (I) and linear oligomers of the formulae (II) to (VI) of 2.58% by weight, where the cyclic component is 1.39% by weight; the proportion therein with ring size n=3 is 0.26% by weight and with n=4 is 0.40% by weight.
PC 2 is a polycarbonate based on bisphenol A, phenol as chain terminator, with an MVR of 12.5 cm$^3$/10 min (300° C./1.2 kg) and a total content of cyclic oligomers of the formula (I) and linear oligomers of the formulae (II) to (VI) of 1.94% by weight, where the cyclic component is 0.67% by weight; the proportion therein with ring size n=3 is 0.25% by weight and with n=4 is 0.19% by weight.
PC1 is thus the polycarbonate having the higher proportion of cycles and linear oligomers.
CoPC is a commercially available copolycarbonate based on bisphenol A and bisphenol TMC, phenol as chain terminator, with an MVR of 17 cm$^3$/10 min (330° C./2.16 kg) (Apec 1745 from Bayer MaterialScience AG).

The polycarbonate PC2 was prepared in a melt process as follows:

From a reservoir, 8600 kg/h of melt mixture consisting of 4425 kg of diphenyl carbonate/h (20 658 mol/h) and 4175 kg of bisphenol A/h (18 287 mol/h), with addition of 0.52 kg of the phenol adduct of tetraphenylphosphonium phenoxide with 65.5% tetraphenylphosphonium phenoxide/h (0.786 mol/h; i.e. 0.0043 mol %) dissolved in 4.5 kg of phenol/h, are pumped through a heat exchanger, heated to 190° C. and conducted through a dwell column at 12 bar and 190° C. The mean residence time is 50 minutes. The melt is then guided through an expansion valve into a separator at 200 mbar. The melt flowing downward is heated back to 190° C. in a falling film evaporator likewise at 200 mbar and collected in a receiver. After a residence time of 20 minutes, the melt is pumped into the next three stages of identical construction. The conditions in the 2nd/3rd/4th stage are 100/74/40 mbar; 220°/225°/273° C. and 20/10/10 minutes. The oligomer formed has a relative viscosity of 1.08. All vapors are conducted through pressure regulators into a column under reduced pressure and led off as condensates. Thereafter, the oligomer is condensed in a downstream disk reactor at 280° C. and 3.0 mbar with a residence time of 45 minutes to give a product of higher molecular weight. The relative viscosity is 1.195. The vapors are condensed. From the melt stream, which is guided into a further cage reactor, by means of a gear pump, a substream of 150 kg of melt/h is branched off, admixed with 150 g of a 5% solution of the quencher of the formula 6 in phenol/h, conducted through a static mixer with a length-to-diameter ratio of 20 and returned to the main melt stream. Directly after the streams merge, the added quencher is distributed homogeneously within the entire melt stream by means of a further static mixer. The melt thus treated continues to be subjected to the process conditions in a further disk reactor at 290° C., 0.7 mbar, with a mean residence time of 120 minutes, discharged and pelletized. The vapors are condensed in the vacuum system and beyond.

The polycarbonate PC1 was prepared in an interfacial process as follows:

In a pumped circulation reactor, upstream of the pump, via a T-piece, 24 000 kg/h of an alkaline bisphenol A solution containing 15% by weight of bisphenol A (BPA) and 2.1 mol of sodium hydroxide solution per mol of BPA, and also, via a further T-piece, 1848 kg/h of phosgene dissolved in 20 400 kg/h of solvent consisting of 50% by weight of methylene chloride and 50% by weight of monochlorobenzene were metered in. To maintain the alkalinity, 360 kg/h of 32% sodium hydroxide solution were metered in and the reaction mixture was guided back to the pump through a heat exchanger and an unstirred dwell vessel, with metered addition of the abovementioned streams. By means of flow measurement, the amount pumped in circulation was determined as being 260 m³/h. The temperature was 36° C. A portion of the emulsion which was as large as the incoming raw materials, upstream of the metering points for BPA and phosgene, from the dwell vessel was fed to a further pump and pumped through a tubular reactor. To this stream were added 1050 kg/h of sodium hydroxide solution (32% by weight) and 134 kg/h of p-tert-butylphenol, dissolved in 536 kg of solvent mixture. After a dwell time of 10 min., 18 kg/h of N-ethylpiperidine in the form of a 4.8% solution in the solvent mixture (50 parts methylene chloride and 50 parts monochlorobenzene) were metered in and the emulsion was pumped by means of a further pump through a further tubular reactor. After a dwell time of a further 10 min., the emulsion was separated in a separating vessel and the polycarbonate solution was washed to free it of electrolyte by known methods, for example by centrifugal technology. The polycarbonate solution was concentrated in concentration systems and freed of residual solvent in a vented extruder.

The copolycarbonate CoPC was prepared analogously to PC1 in an interfacial process. The BP-TMC to BPA ratio is chosen such that a VICAT B temperature of 170° C. is attained.

The copolycarbonate compositions of examples 1-6 based on the raw materials PC1 and PC2 and CoPC (Apec 1745) are mixed in a twin shaft extruder at 300° C. in the formulations listed in tables 1 and 2. The polymer compositions thus obtained by compounding are pelletized and are available for physical polymer characterizations.

Determination of the Content of Cyclic and Linear Oligomers

The sample is dissolved with methylene chloride. By adding acetone, the predominant proportion of the polymer is precipitated. The undissolved fractions are filtered off; the filtrate is concentrated to dryness. The dry residue is dissolved with THF and the oligomers are determined by HPLC with UV detection.

Characterization of the Molding Compositions of the Invention (Test Methods):

The melt volume flow rate (MVR) is determined at 300° C. and load 1.2 kg or at 330° C. and load 2.16 kg with a melt index tester according to ISO 1133.

The Vicat temperature VST B50 is determined according to ISO 306, method B at a heat load of 50 K/h.

The yellowness index YI is determined according to DIN 6167. The optical transmission is determined according to DIN 5036 and the turbidity according to DIN 53490.

TABLE 1

Copolycarbonate compositions

| Experiment | | 1 | 2 | 3 | 4 | 5 | 6 |
|---|---|---|---|---|---|---|---|
| CoPC | % | 75 | 50 | 25 | 75 | 50 | 25 |
| PC 1 | % | 25 | 50 | 75 | — | — | — |
| PC 2 | % | — | — | — | 25 | 50 | 75 |

Experiments 1-3 are in accordance with the invention and have the higher proportion of cyclic and linear oligomers. Experiments 4-6 are comparative examples with respect to the inventive examples 1-3.

TABLE 2

Rheological and thermal properties of the copolycarbonate compositions

| Experiment | 1 | 2 | 3 | 4 | 5 | 6 |
|---|---|---|---|---|---|---|
| MVR/330° C./2.16 kg/7 min. | 20.6 | 26.2 | 34.0 | 21.2 | 29.4 | 41.1 |
| Vicat VSTB120 [° C.] | 162.6 | 157.7 | 152.6 | 163.0 | 157.0 | 151.4 |
| Vicat VSTB50 [° C.] | 161.5 | 156.7 | 151.5 | 161.5 | 155.2 | 150.0 |

The values in table 2 show that the good thermal properties (Vicat temperatures) are maintained even though the proportion of cyclic and linear oligomers is greater.

TABLE 3

Properties after heat storage at 140°C.

| Heat storage at 140° C. | | 1 | 2 | 3 | 4 | 5 | 6 |
|---|---|---|---|---|---|---|---|
| 500 h | | | | | | | |
| Transmission | % | 85.73 | 86.56 | 87.46 | 85.58 | 85.98 | 85.67 |
| Turbidity | % | 0.5 | 0.39 | 0.43 | 0.4 | 0.31 | 0.41 |
| Y.I. | | 6.1 | 6.39 | 6.88 | 7.18 | 9.59 | 12.74 |
| 1000 h | | | | | | | |
| Transmission | % | 84.56 | 85.22 | 85.73 | 84.11 | 83.15 | 80.75 |
| Turbidity | % | 0.54 | 0.42 | 0.42 | 0.34 | 0.32 | 0.35 |
| Y.I. | | 11.96 | 12.35 | 14.2 | 14.25 | 20.72 | 29.74 |
| 1500 h | | | | | | | |
| Transmission | % | 83.25 | 83.51 | 83.2 | 82.29 | 79.55 | 76.47 |
| Turbidity | % | 0.7 | 0.51 | 0.44 | 0.43 | 0.32 | 0.38 |
| Y.I. | | 17.8 | 19.69 | 22.94 | 21.89 | 33.81 | 43.84 |

The values in table 3 show that the inventive copolycarbonate compositions 1 to 3, after heat storage at 140° C. (for 500 h, 1000 h or 1500 h), show much lower yellowing—represented by the yellowness indices YI—than comparative examples 4 to 6.

The higher proportion of cycles and linear oligomers thus leads to a lower degree of yellowing. This is surprising since, in the injection molding process for production of the test specimens, because of the poorer flowability, higher thermal stress is produced internally, which should lead to thermal damage (yellowing) which should be reflected in a higher yellowness index after heat storage. Moreover, oligomeric constituents have lower thermal stability, which should likewise have an adverse effect on yellowing in the course of heat storage.

The invention claimed is:
1. A copolycarbonate composition comprising:
   A) 5% to 99% by weight, based on the total weight of the copolycarbonate composition, of a copolycarbonate containing one or more monomer units of the formula (1):

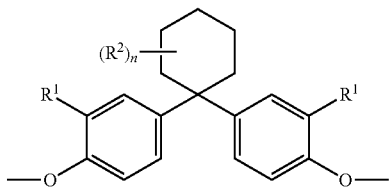

wherein,
R¹ is hydrogen;
R² is a methyl group; and
n is 3; and

B) 95% to 1% by weight, based on the total weight of the copolycarbonate composition, of a (co)polycarbonate containing one or more monomer units of the general formula (2):

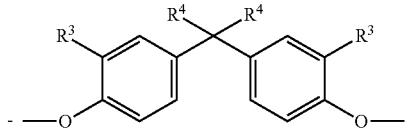

wherein,
R³ is H, linear $C_1$-$C_{10}$ alkyl, or branched $C_1$-$C_{10}$ alkyl; and
R⁴ is linear $C_1$-$C_{10}$ alkyl or branched $C_1$-$C_{10}$ alkyl;
and wherein component B) does not have any monomer units of the formula (1);
wherein component B contains at least one cyclic oligomer of the general formula (I) in a total amount of 1.10% by weight to 1.50% by weight, based on the weight of component B:

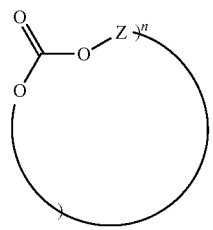

wherein,
n is an integer from 2 to 6; and
Z is a radical of the formula (Ia):

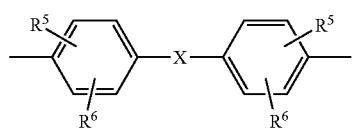

wherein,
R⁵ and R⁶ are each independently H or $C_1$-$C_8$-alkyl and X is a single bond, $C_1$- to $C_6$-alkylene, $C_2$- to $C_5$-alkylidene, or $C_5$- to $C_6$-cycloalkylidene, which may be substituted by $C_1$- to $C_6$-alkyl;
and component B contains one or more linear oligomers of the general formulae (II), (III), (IV), (V) and/or (VI) in a total amount of 0.50% by weight to 1.40% by weight, based on the weight of component B:

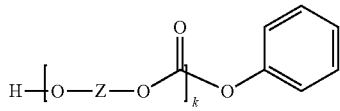

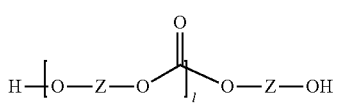

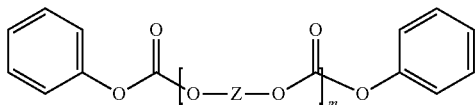

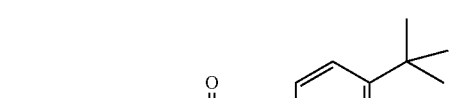

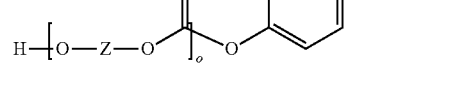

wherein
k, l, m, o and p are each independently an integer from 1 to 6; and
Z is the radical of the formula (Ia);
wherein the amounts of the structures (I) and (II) to (VI) are determined by precipitation and subsequent quantitative HPLC.

2. The copolycarbonate composition as claimed in claim 1, wherein the one or more linear oligomers of the formulae (II) to (VI) are present in component B in an amount of 0.60% by weight to 1.35% by weight, based on the weight of component B.

3. The copolycarbonate composition as claimed in claim 1, wherein the total amount of the cyclic oligomers of the general formula (I) and the linear oligomers of the general formulae (II), (III), (IV), (V) and (VI) in component B adds up to at least 2.0% by weight, based on the weight of component B.

4. The copolycarbonate composition as claimed in claim 1, wherein cyclic oligomers of the formula (I) with n = 4 comprise the largest proportion of the cyclic oligomers of the formula (I), based on the total amount of the cyclic oligomers of the formula (I) in component B.

5. The copolycarbonate composition as claimed in claim 1, wherein X is a single bond or isopropylidene and R⁵ and R⁶ are each independently H or $C_1$-$C_4$-alkyl.

6. The copolycarbonate composition as claimed in claim 1, wherein the proportion of the monomer units of the formula (1) in the copolycarbonate is 0.1-88 mol % (based on the sum total of the diphenol monomer units present therein).

7. The copolycarbonate composition as claimed in claim 1, wherein component A additionally contains monomer units of the formula (4):

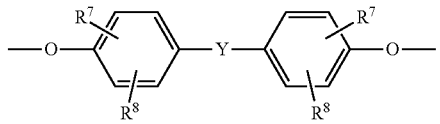
(4)

wherein
R$^7$ and R$^8$ are each independently H, C$_1$-C$_{18}$-alkyl, C$_1$-C$_{18}$-alkoxy, a halogen, substituted aryl, or aralkyl; and
Y is a single bond, —SO$_2$—, —CO—, —O—, —S—, C$_1$-C$_6$-alkylene, C$_2$-C$_5$-alkylene, C$_6$-C$_{12}$-arylene, or C$_6$-C$_{12}$-arylene which is fused to further aromatic rings containing heteroatoms.

8. The copolycarbonate composition as claimed in claim 1, wherein component A and/or component B contains, as end group, a structural unit of the formula (3a) and/or (3b):

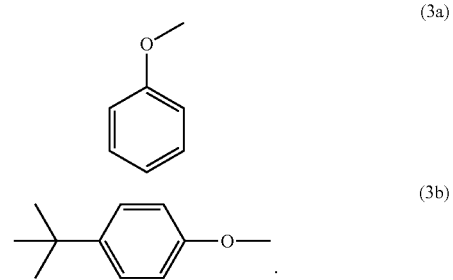
(3a)
(3b)

9. The copolycarbonate composition as claimed in claim 1, wherein component A contains monomer units derived from compounds of the general formulae (1b) and (4c):

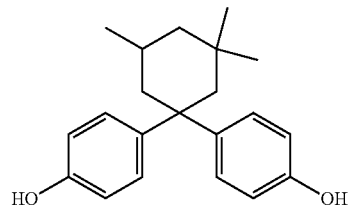
(1b)

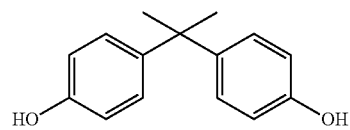
(4c)

and, in the monomer units of the general formula (2) of component B, R$^3$ is H and R$^4$ is linear C$_1$-C$_6$ alkyl or branched C$_1$-C$_6$ alkyl.

10. The copolycarbonate composition as claimed in claim 1, wherein 0% to 5% by weight, based on the total weight of the copolycarbonate composition, of organic additives is present in the composition.

11. The copolycarbonate composition as claimed in claim 1, wherein at least one additive from the group consisting of thermal stabilizers, demolding agents, and UV absorbers is present.

12. An article comprising a blend, molding, bezel, reflector, indicator, lens, screen/display cover, LED, extrudate, film, film laminate, or coextrusion layer comprising the copolycarbonate composition as claimed in claim 1.

13. A molding, extrudate, film, or film laminate comprising the copolycarbonate composition as claimed in claim 1.

14. A molding, extrudate, or film comprising coextrusion layers comprising the copolycarbonate composition as claimed in claim 1.

* * * * *